Nov. 20, 1934.  E. W. HARVEY  1,981,729
PROCESS AND APPARATUS FOR DISPENSING MEASURED CHARGES OF LIQUEFIED GAS
Filed Dec. 30, 1933
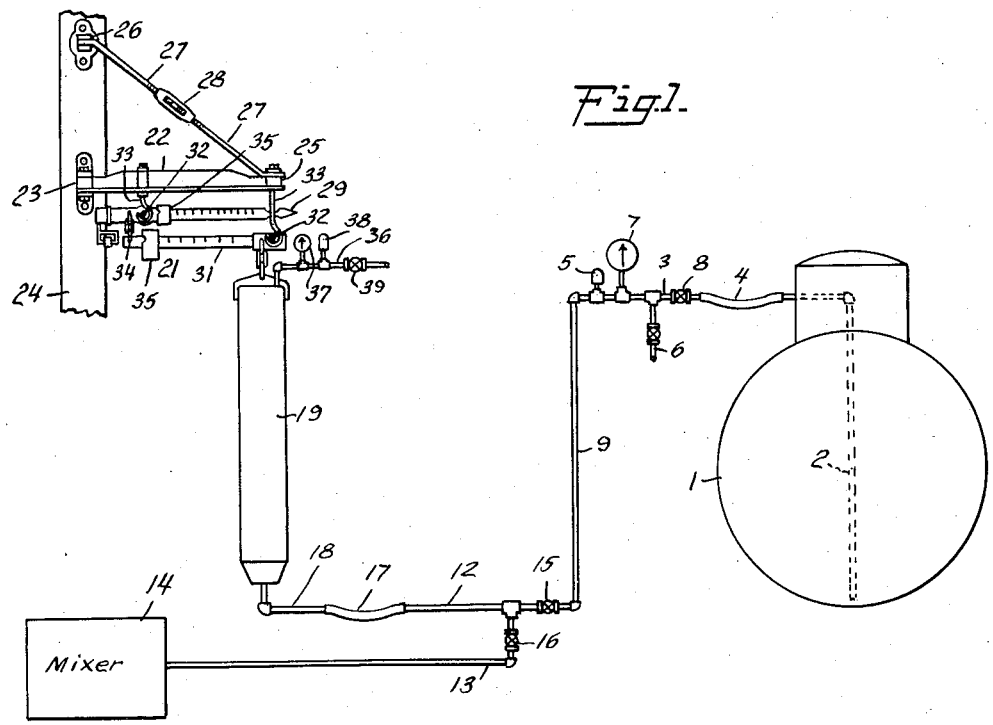
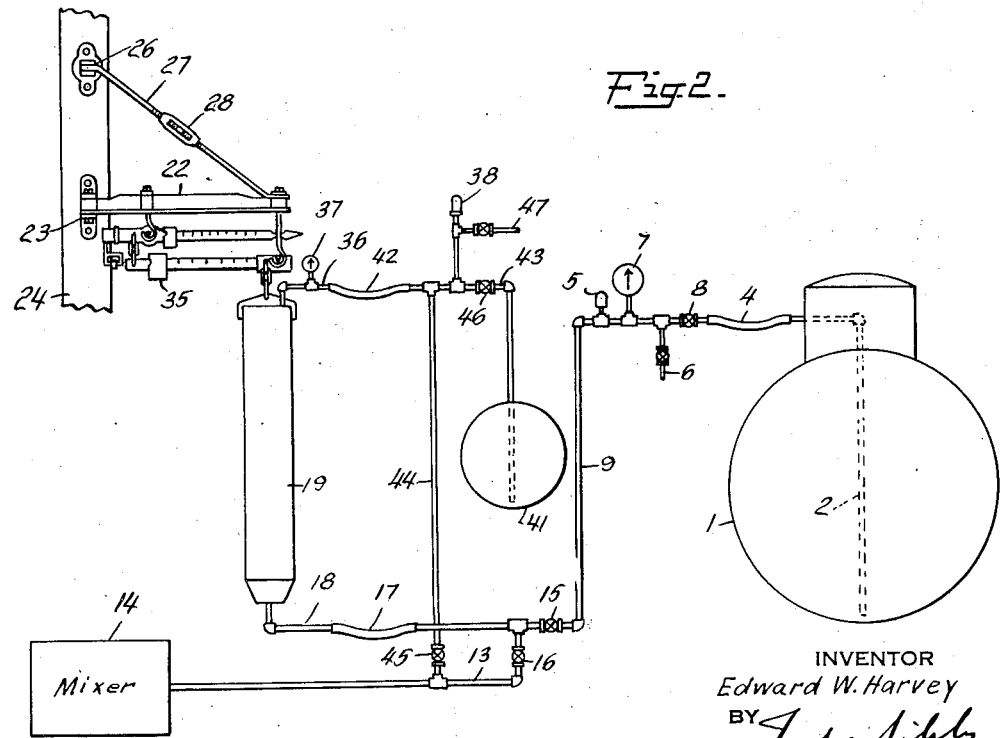
INVENTOR
Edward W. Harvey
BY
ATTORNEY Patented Nov. 20, 1934

1,981,729

UNITED STATES PATENT OFFICE 1,981,729

PROCESS AND APPARATUS FOR DISPENSING MEASURED CHARGES OF LIQUEFIED GAS

Edward W. Harvey, Highland Park, N. J., assignor to The Barrett Company, New York, N. Y., a corporation of New Jersey Application December 30, 1933, Serial No. 704,797

10 Claims. (Cl. 62—1)

This invention relates to the dispensing of measured amounts of liquids having high vapor pressures (liquids having vapor pressures substantially above atmospheric pressure) such as liquefied gas maintained under superatmospheric pressure, and more particularly, to the dispensing of measured amounts of liquid anhydrous ammonia, from a tank car or other bulk supply thereof in which the gas is maintained under superatmospheric pressure into a mixer, such as a fertilizer mixer.

The usual practice in dispensing liquid ammonia from a tank car has included a measuring tank, and an ammonia compressor which has been employed to withdraw gas from the top of the measuring tank and discharge it into the top of the tank car, thus creating a pressure differential between the tank car or other storage tank and the measuring tank sufficient to cause the liquid ammonia to flow from the tank car into the measuring tank. In certain instances, a compressor has been employed to force air or inert gas into the tank car, thus creating a pressure in the tank car higher than the pressure corresponding to the temperature in the measuring tank. These procedures are objectionable because of the relatively expensive equipment for their practice and the expense involved in the maintenance and operation of such equipment.

It is evident that a discharge of liquid ammonia from a tank car into a measuring tank could be effected by venting the measuring tank to the atmosphere, which would reduce the pressure in the measuring tank beneath the pressure in the tank car. With the tank car containing ammonia at a pressure of say 50 pounds per square inch gauge and a corresponding temperature of 34° F., and assuming that the pressure in the measuring tank must be 25 pounds per square inch gauge less than the pressure in the tank car, in order to cause ammonia to flow through the connecting pipe at rates desirable in commercial operation, more than 4 per cent of the ammonia would have to be vented to cause the ammonia to flow into the measuring device. It will be seen, therefore, that venting to the atmosphere is not commercially feasible because of the loss of ammonia incident thereto. The provision of equipment for recovering the ammonia thus vented involves the objectionable expense of constructing, maintaining, and operating the recovery equipment.

Furthermore, the ammonia cannot be vented to the mixer without interfering with operation, since the operation of a fertilizer mixer is usually, if not always, a batch operation, and it is necessary to synchronize the introduction of ammonia with a certain step of the mixing procedure. For example, in the ammoniation of superphosphate or superphosphate mixtures, it is the practice to spray the ammonia over the superphosphate material immediately after it has entered the mixer. Accordingly, if it is attempted to vent the measuring tank to the mixer, the measuring tank can be filled only after the introduction of superphosphate into the mixer, at which time the mixer is ready to receive the full charge of ammonia. This causes a delay in operation.

It is an object of this invention to provide a process and apparatus for dispensing measured quantities of a liquefied gas, such as ammonia, from a tank car or other main bulk thereof under superatmospheric pressure into a mixer such as a fertilizer mixer, the dispensing of the ammonia in normal operation being independent of the mixer and being accomplished by the use of relatively inexpensive equipment which is simple to operate and free from hazards of injury to workmen. The apparatus necessary for practicing this invention does not involve the use of pumps or compressors.

Contrary to the general belief that the introduction of liquid ammonia from a tank car into a measuring vessel initially at a temperature such that the vapor pressure of ammonia at this temperature is somewhat above the vapor pressure of the ammonia in the tank car would be impossible, I have found that by using a measuring vessel of increased volumetric capacity as compared with the measuring vessels heretofore employed, liquid ammonia may be discharged directly from the tank car or other bulk supply thereof into the measuring vessel under the vapor pressure of the ammonia in the tank car and without the use of auxiliary equipment or the venting of the vessel into the mixer during normal operation. The measuring vessel of this invention may have a volumetric capacity such that after the introduction of the desired liquid charge, there is a gas space above the liquid charge of a volume equal to or greater than the volume occupied by the liquid charge, i. e., the volumetric capacity of the vessel is at least twice the volume occupied by the desired charge of liquid ammonia. Preferably, however, to take care of extreme conditions which may be encountered, the measuring vessel is of such volumetric capacity that the gas space above the level of liquid ammonia after the desired charge has been introduced thereinto, is somewhat more than two times the volume occupied by the charge of liquid ammonia. For example, if a charge of 100 pounds of liquid anhydrous ammonia is to be introduced into the mixer during each cycle of charging the mixer, a measuring tank approximately 12 inches in diameter and 72 inches in length, having an internal capacity of 4½ cubic feet may be employed. A 100 pound charge of liquid ammonia will occupy the lower 20 inches of the vessel, the remaining 52-inch length of the vessel constituting the gas space above the liquid ammonia.

I have found further that during the charging of liquid ammonia into the measuring vessel, the rate of flow into the vessel during the introduction of successive charges being substantially the same, the vapor pressure of the liquid in the measuring vessel builds up gradually in proportion to the amount of liquid in the vessel, so that when the desired charge is introduced into the vessel, the gauge registers a pressure approximately the same for each successive charge of equal amount. This enables the operator to anticipate the drop of the scale beam and shut off the flow of ammonia at just the right point to give accurate weighings. In operation it would be possible for the operator to determine the approximate amount of ammonia introduced into the weigh bottle by means of the pressure gauge alone. However, in actual use, the pressure gauge is used merely as a means of indicating when the scale beam is about to drop.

In the preferred embodiment illustrated on the drawing, the invention is shown incorporated in liquid ammonia dispensing equipment and the present disclosure will be confined to the present illustrated embodiment of the invention. It will be understood, however, that the novel features and improvements are susceptible to other applications, for example, to the dispensing of measured amounts of other liquids having high vapor pressure, such as concentrated aqua ammonia, ammonia-salt solutions, etc. Hence, the scope of this invention is not confined to the embodiment herein described.

In the drawing—

Fig. 1 is a side elevation of apparatus embodying a preferred form of this invention; and Fig. 2 is a side elevation of an arrangement of apparatus for practicing this invention involving an absorber communicating with the measuring vessel.

Referring to the drawing, reference character 1 designates a tank car of usual construction for transporting anhydrous ammonia. This tank car is provided with a dip pipe 2. A pipe 3 is connected with the dip pipe 2 by a flexible connection 4. Pipe 3 is equipped with a relief valve 5, a valve-controlled drain line 6, pressure gauge 7, and a regulating valve 8. A pipe 9 has one end communicating with pipe 3 and the other end with a pipe 12. A branch pipe 13 leads from the pipe 12 to the fertilizer mixer 14. Valves 15 and 16 are disposed in pipe lines 12 and 13, respectively. It is important that the piping connecting the tank 1 with vessel 19 be of sufficient capacity to permit a relatively rapid flow of liquid ammonia into the vessel upon opening of the valves 8 and 15. In the case of the apparatus designed to deliver a charge of the order of 80 to 100 pounds, piping having a one-inch internal diameter will be found satisfactory.

Pipe 12 is connected by flexible connection 17 with inlet and discharge pipe 18 leading into the base of the weigh tank or measuring vessel 19 which may be of steel or iron. In the embodiment of the invention shown on the drawing, the vessel 19 is a relatively long tank of a volumetric capacity such that upon the introduction of the desired liquid charge, a gas space above the liquid ammonia equal to approximately two times the volume occupied by the charge of liquid ammonia is provided. The vessel 19 is suspended from the weighing scale 21 which may be of any well-known type. While a weighing scale is preferred, a sight glass or float indicator for showing the level, and hence the volume, of liquid ammonia in the vessel 19 may be substituted for the weighing scale. As shown on the drawing, the weighing scale is carried by a beam 22 pivotally secured as at 23 to a standard 24. End 25 of the beam 22 is pivotally secured as at 26 to the standard 24 by rods 27 fastened by a turn buckle 28. The scale 21 involves a pair of arms 29, 31 having knife edge bearings 32 mounted on the hooked supports 33 extending from beam 22. Links 34 connect arm 29 with 31 and each of the arms may be provided with a movable counter weight 35. As will be understood, the counterweights 35 may be adjusted to counter-balance the weight of the measuring vessel and any desired charge which it is desired to introduce thereinto.

Leading from the top of the vessel 19 is a pipe 36 provided with a pressure gauge 37, a relief valve 38, and a controlling valve 39. Pipe 36 may lead directly into the mixer 14.

The apparatus of Fig. 2 differs from that of Fig. 1, chiefly in that an absorber 41 containing acid or other liquid, such as water or dilute ammonia solution for absorbing ammonia, is provided. The absorber communicates with the top of the measuring vessel 19 by means of a pipe 43 connected by flexible tubing 42 with the pipe 36. Corresponding parts in both figures of the drawing are indicated by the same reference numerals. As shown on Fig. 2, a valve 46 controls flow from the measuring vessel 19 into the absorber 41. A pipe 44 connects pipe 43 with the pipe 13 which communicates with the mixer 14. A valve 45 controls the flow through the pipe 44. A valve-controlled vent pipe 47 leads from the pipe line equipped with safety valve 38 and communicating with the pipe 43.

Thermal insulation is placed about the parts of the apparatus through which ammonia flows.

In operation, if the vessel 19 contains ammonia gas at superatmospheric pressure, e. g., from a previous day's operations, and it is desired to start up the apparatus, all valves being closed, valve 39 (in the case of the apparatus of Fig. 1) is opened, allowing ammonia gas to escape and reducing the pressure in vessel 19 to atmospheric. In the case of starting up the apparatus of Fig. 2, valve 45 may be opened so that the vessel 19 is vented to the mixer through pipes 36, 42, 44, and 13, or valve 45 may be closed and 46 opened, in which case vessel 19 is vented to the absorber 41 through pipes 36, 42, and 43, thereby reducing the pressure substantially to atmospheric. Valve 39 or 45 is then closed and ammonia is admitted to tank 19 by opening valves 8 and 15. As the liquid ammonia rushes into the vessel 19, a small portion thereof is vaporized, the ammonia gas collecting in the gas space of the vessel, and during the starting up of the apparatus, the ammonia gas passes with the air in the vessel to the mixer or the absorber as the case may be. In this manner, air contained in the vessel 19 is removed therefrom, and due to evaporation of some ammonia within vessel 19, the temperature of the vessel is lowered.

In normal operation, i. e., once the apparatus has been started up and excess pressure relieved, it is necessary only to open valves 8 and 15 and close valve 15 when the desired charge of liquid ammonia has been introduced into the vessel 19, as indicated by the scale or by the pressure gauge 37. As the liquid ammonia enters the vessel a certain amount of the liquid is vaporized, refrigerating and reducing its vapor pressure so that there continues to be a pressure differential between the liquid in the tank car or storage tank and the liquid in the measuring vessel. When the desired charge of liquid ammonia has been introduced into vessel 19, as indicated by the scale, valve 15 is closed. When it is desired to discharge the liquid from vessel 19, valve 16 is opened and all of the liquid ammonia is forced out by its own vapor pressure and the gas is allowed to discharge until the pressure in vessel 19 drops to atmospheric pressure or sufficiently, as determined by experience, to allow entrance of the succeeding charge. During the discharge of the liquid ammonia and the gas there is an additional refrigerating action which helps to lower the temperature of the walls of vessel 19, thus facilitating the entrance of the succeeding charge. During the continuous operation of the apparatus the walls of the weighing vessel become quite cold as a result of the refrigerating action of the intake and exit of liquid ammonia. The colder the walls of the measuring vessel, the greater becomes the differential in vapor pressure between the liquid in the storage tank and that introduced into the measuring vessel. Consequently, the greater the amount of liquid which may be introduced into the weigh vessel of given volume. In normal operation, valve 39, in the case of the apparatus of Fig. 1, and valves 46, 45 in the case of that of Fig. 2, are maintained closed, and accordingly, during the charging of vessel 19, escape of ammonia gas therefrom is prevented.

In practice, I have introduced a desired charge of liquid ammonia into the measuring vessel of my invention from a supply of liquid ammonia at a pressure of 165 pounds per square inch gauge and a temperature of about 90° F., the measuring vessel being at room temperature, which was 93° F. Liquid ammonia at 93° F. has a vapor pressure equivalent to 175 pounds per square inch gauge. Thus, the liquid ammonia was introduced into the measuring vessel at an adverse temperature differential equivalent to a pressure of 10 pounds per square inch gauge. This may be explained on the basis that upon the introduction of the liquid ammonia into the vessel, a certain time interval is required before the vapor pressure builds up in the large gas space above the level of liquid ammonia and equilibrium pressure conditions are reached such that the gas pressure in the measuring vessel exceeds the vapor pressure of the supply of ammonia. Before such equilibrium conditions are reached, the desired charge flows into the measuring vessel and the valve in the line connecting the measuring vessel with the tank car is closed, preventing the back flow of ammonia. Furthermore, due to the large gas space in the measuring vessel, vaporization of some of the ammonia in this vessel during the introduction of the measured charge thereinto takes place, causing the cooling by evaporation of the remainder of the charge of liquid ammonia introduced into the vessel 19. This cooling is such that the temperature, and hence the vapor pressure, of the cooled ammonia in the vessel 19 is lower than that of the ammonia in the tank car or other supply thereof, thereby creating the pressure differential which causes flow of liquid ammonia from the tank car or other supply into the vessel 19.

In one instance of the practice of this invention on a plant scale, operating on a three-minute cycle, i. e., the measuring vessel was filled with a 44-pound charge of liquid ammonia from a tank car in which the ammonia was at a pressure of 137 pounds gauge and this charge was emptied into the mixer once every three minutes, after a few charges (3 or 4) it was found that a temperature differential of 29° F., equivalent to a pressure differential of 57 pounds, between the vapor pressure in the tank car and that in the weigh bottle was established.

In another example of the practice of this invention on a plant scale, crude nitrogen solution, consisting of 45 per cent of nitrate of soda, 45 per cent of anhydrous ammonia, and 10 percent of water and having a vapor pressure at atmospheric temperatures of 60 pounds or more, was added to a fertilizer mix containing superphosphate, the mixing taking place in a rotary mixer of two tons capacity. Twenty-eight charges per hour were introduced into the mixer, each charge involving the introduction of one hundred pounds of nitrogen solution into the mixer containing four thousand pounds of mixed fertilizer. The pressure in the tank car containing the nitrogen solution was 60 pounds per square inch gauge. Operating in accordance with this invention, it was found that a pressure differential of 10 pounds per square inch gauge between the vapor pressure in the tank car and that in the weigh or measuring vessel was established.

It will be noted that in the practice of this invention, the flow of ammonia into the vessel is interrupted as soon as approximately one-half the volume of the vessel is filled with liquid. Hence, recondensation of gaseous ammonia with consequent warming up of the contents of the measuring vessel and the vessel is minimized, if not completely avoided. Further, in expelling the liquid ammonia from the vessel 19 into the mixer 14, vaporization of some ammonia, including residual ammonia remaining as a film on the walls of the vessel, takes place, resulting in the cooling of the walls of the measuring vessel. Consequently, when a fresh charge of liquid ammonia is introduced into the vessel 19, the cooling effect of the walls results in the lowering of the temperature of the incoming liquid ammonia. It will be noted that in accordance with this invention, cooling of the measuring vessel takes place both during the introduction of a charge of liquid ammonia thereinto and during the discharge of liquid ammonia therefrom into the fertilizer mixer.

Since certain changes in carrying out the above process and in the construction set forth which embody this invention may be made without departing from its scope, it is intended that all matter contained in the above description or shown on the accompanying drawing shall be interpreted as illustrative and not in a limiting sense.

I claim:

1. The process of dispensing measured quantities of a liquid having a high vapor pressure from a main bulk thereof, which comprises withdrawing a measured amount of said liquid, and during the withdrawal of said liquid, cooling the same by self-evaporation while preventing the escape of the resultant vapors.

2. The process of dispensing measured quantities of liquid ammonia from a main bulk thereof under superatmospheric pressure, which comprises withdrawing a measured amount of said liquid ammonia and during the withdrawal of the ammonia, cooling it by self-evaporation while preventing the escape of the resultant ammonia gas.

3. The process of dispensing measured quantities of a liquid having a high vapor pressure from a main bulk thereof, which comprises successively feeding said liquid into a measuring device while preventing escape of vapor from said device until a predetermined pressure is reached in said device, and thereupon discontinuing the feeding of said liquid into said measuring device.

4. The process of dispensing measured quantities of liquid ammonia from a main bulk thereof under superatmospheric pressure into a mixer which comprises separately feeding successive charges of liquid ammonia into a measuring device while preventing escape of gas from the measuring device until a predetermined pressure is reached in the measuring device, and thereupon discontinuing the feed of said liquid ammonia into the measuring device and discharging the contents of the measuring device into the mixer.

5. The process of dispensing measured quantities of liquefied gas from a main bulk thereof, which comprises passing the gas from the main bulk into a measuring vessel having a gas space above the level of the desired charge of liquefied gas sufficient to permit the gasification of some of the liquefied gas and the introduction of the desired charge before equilibrium between the pressure of the gas in the vessel and the vapor pressure of the main bulk of liquefied gas is reached, and interrupting the passage of the liquefied gas into the measuring vessel when the desired charge has been introduced thereinto and before such equilibrium conditions are reached.

6. The process of dispensing measured quantities of liquid ammonia from a main bulk thereof under superatmospheric pressure, which comprises the introduction of said liquid ammonia into a measuring vessel having a volumetric capacity at least equal to two times the volumetric capacity occupied by the desired measured charge of liquid ammonia, and interrupting the introduction of the liquid ammonia into said vessel upon the introduction of the desired charge and prior to the establishment of equilibrium pressure conditions within the vessel between the pressure of the gas therein and the vapor pressure of the liquid ammonia introduced thereinto.

7. The process of dispensing measured quantities of liquid ammonia from a main bulk thereof under superatmospheric pressure, which comprises the step of introducing a measured charge of liquid ammonia into a vessel having a volumetric capacity at least equal to approximately two times the volume occupied by the desired measured charge of liquid ammonia while preventing escape of gas from said vessel.

8. The process of dispensing measured quantities of liquid ammonia from a main bulk thereof under superatmospheric pressure into a vessel in which the pressure is lower than that of said main bulk, which comprises, separately feeding successive charges of liquid ammonia into a measuring device while preventing escape of gas from the measuring device until a predetermined pressure is reached in the measuring device, and thereupon discontinuing the feed of said liquid ammonia into the measuring device and discharging the contents of the measuring device into the said vessel.

9. In apparatus for dispensing measured quantities of liquid ammonia, in combination, a source of liquid ammonia under super-atmospheric pressure, a mixer at a pressure below the vapor pressure of said source of liquid ammonia and adapted to receive a given charge of ammonia, a measuring vessel supported by a weighing scale, said measuring vessel having a volumetric capacity equal to at least twice the volume of said given charge, conduit means provided with a valve connecting said source of liquid ammonia with said measuring vessel and conduit means provided with a valve connecting said measuring vessel with said first mentioned vessel.

10. In apparatus for dispensing measured quantities of a liquid having a high vapor pressure, in combination, a source of such liquid under superatmospheric pressure, means at a pressure below the vapor pressure of such liquid at the said source thereof adapted to receive a given charge of such liquid, a measuring vessel having a volumetric capacity equal to at least twice the volume of said given charge, means for ascertaining the amount of charge delivered to said measuring vessel, conduit means provided with a valve connecting said source with said measuring vessel and conduit means provided with a valve connecting said measuring vessel with the first mentioned means.

EDWARD W. HARVEY.